(12) United States Patent
Bustamante et al.

(10) Patent No.: US 7,133,144 B2
(45) Date of Patent: Nov. 7, 2006

(54) CLOSED LOOP FEEDBACK SYSTEM FOR ALTERNATIVE TONERS

(75) Inventors: Louis A. Bustamante, Mead, CO (US); Samuel N. Hopper, Longmont, CO (US); Michael G. Munson, Superior, CO (US); John C. Wilson, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 924 days.

(21) Appl. No.: 09/912,378

(22) Filed: Jul. 26, 2001

(65) Prior Publication Data

US 2003/0021607 A1   Jan. 30, 2003

(51) Int. Cl.
G06K 15/00 (2006.01)
G06F 3/12 (2006.01)

(52) U.S. Cl. .................................. 358/1.14; 358/1.15
(58) Field of Classification Search ............... 358/1.5, 358/1.12, 1.13, 1.14, 1.15; 347/5, 6, 14, 347/19
See application file for complete search history.

(56) References Cited

U.S. PATENT DOCUMENTS

| | | | |
|---|---|---|---|
| 4,958,192 A * | 9/1990 | Kusumoto | 399/12 |
| 4,961,088 A | 10/1990 | Gilliland et al. | |
| 4,963,939 A | 10/1990 | Kurando et al. | |
| 4,994,853 A | 2/1991 | Fukuchi et al. | |
| 5,049,937 A * | 9/1991 | Takeda | 399/45 |
| 5,075,724 A | 12/1991 | Wada et al. | |
| 5,184,181 A * | 2/1993 | Kurando et al. | 399/262 |
| 5,289,242 A | 2/1994 | Christensen et al. | |
| 5,546,170 A * | 8/1996 | Ohba et al. | 399/58 |
| 5,761,566 A | 6/1998 | Suzuki et al. | |
| 6,009,285 A | 12/1999 | Barry et al. | |
| 6,151,459 A | 11/2000 | Hashimoto et al. | |
| 6,212,338 B1 | 4/2001 | Hagihara et al. | |
| 6,233,410 B1 | 5/2001 | Seber et al. | |
| 6,240,262 B1 | 5/2001 | Taniyama et al. | |
| 6,290,322 B1 * | 9/2001 | Noguchi et al. | 347/23 |
| 6,502,916 B1 * | 1/2003 | Naka | 347/14 |
| 6,543,872 B1 * | 4/2003 | Ohtsuka et al. | 347/19 |
| 6,771,378 B1 * | 8/2004 | Akiyama et al. | 358/1.14 |
| 6,971,732 B1 * | 12/2005 | Seshimo et al. | 347/19 |

* cited by examiner

*Primary Examiner*—Dov Popovici
(74) *Attorney, Agent, or Firm*—Whitham, Curtis, Christofferson & Cook, PC; Dale M. Crockatt

(57) ABSTRACT

Errors in regard to toner materials which may or may not correspond to toner materials installed in a developer unit of a print engine are avoided by providing storage of data concerning the toner in the printer rather than the dedicated processor. A feedback link is thus developed which extends from the developer unit or print engine through the dedicated processor to the supporting processors. Confidence levels in the correspondence of the information and the installed toner are increased by use of a simple switch position associated with the location of a developer unit. The feedback arrangement for avoidance of printing errors is also fully compatible with a customer changeable developer feature while allowing the printer to be operated in accordance with operating parameters specific to a special purpose toner such as MICR or a color toner.

10 Claims, 1 Drawing Sheet

CLOSED LOOP FEEDBACK SYSTEM FOR ALTERNATIVE TONERS

BACKGROUND OF THE INVENTION

1. Field of the Invention

The present invention generally relates to computer controlled printers and, more particularly, to printers which are capable of printing with different toners.

2. Description of the Prior Art

While many arrangements for printing of indicia on various sheet materials such as paper have been known for many years, the development and widespread use of the computer (and, possibly, personal computers, in particular) has led to many recent advances in printers which enhance image quality, provide high throughput and/or provide additional or a broadened range of capabilities. Thus, at the present time, computer controlled printers are used not only for generation of documents and correspondence but also for publication and even manufacture of items which involve production of a persistent image.

Many such items (e.g. the forms used for personal checks and other financial and business instruments) are processed by machine after or during use and must be standardized with high accuracy while being printed on a material that may include security features which increase material expense using a material that can be reliably sensed by the machine. Similar concerns may be present to greater or lesser degrees in regard to many other manufactured items that may be produced by printing processes, particularly since the development of techniques for digital representation of images at high resolution with more readily manageable amounts of data.

Computer controlled printers are generally designed for the broadest possible range of applications. Therefore, such printers are generally compatible with many different inks or toners, generally provided in developer units (generally in the form of a cartridge or wheeled cart (depending on the size and capacity of the printer) for loading toner into and unloading toner from a print engine, and many different types of materials on which printing is to be performed. For this reason, it is not practical to provide different toners in developer units which are not physically interchangeable.

However, particular qualities desired in the printed product may require specific toners and/or materials. As a particularly familiar example, while the dimensions of 8½"× 11" and so-called A4 paper are somewhat similar, they differ sufficiently to make differences in formatting of text and/or graphics desirable. Therefore, most word processor applications provide codes associated with a given document indicating the chosen paper size and will communicate with connected printers to ascertain the paper size available and correspondence with document format before printing of the document is permitted.

Unfortunately, some applications of computer controlled printers are far more critical and much less readily monitored In the case of photographic images, color toners and inks must be of an appropriate density and opacity and be distributed in the correct quantity in order to render shades of color accurately or in the desired manner. If the application of toner or ink is not correct in quantity or proportion between all primary colors and black, very objectionable distortion of the color gamut results while consuming expensive, high-quality paper stock often having an expensive finish applied simulating photographic papers. (Such distortions are sufficiently evident and objectionable that many high-quality printers provide for adjustment of printing control parameters based on the number of copies made after each replenishment of toner.) High speed printers can consume large quantities of such expensive printing stock before a color error due to incorrect toner or printer control parameter is discovered.

An even more critical example is the case of check forms, alluded to above, which require a toner, referred to as MICR (Magnetic Ink Character Recognition), having specific magnetic properties in order to be later processed by specialized machinery at the high speed. Such automation of processing is made necessary by high volume of daily current usage of such forms. The stock on which such forms are generally printed normally includes security features to protect against modification attempting to alter the monetary value thereof. Thus, if a MICR or other required toner is not used when required to develop certain required properties of the printed indicia, the printed article may be unusable and worthless while a potentially large quantity of expensive stock has also been consumed. Conversely, if the correct toner is used on improper stock, potentially usable documents which are particularly susceptible to fraudulent modification may be produced.

Unfortunately, neither the nature of the toner nor the nature of the stock on which printing is to be performed is readily detectable by the printer unless very expensive and sophisticated sensors (e.g. density sensors or page readers), intended to respond to relatively subtle differences in materials (and which may also be susceptible to errors and result in effective inoperability of the printer for that reason) are employed. Such a possibility is in marked distinction to the simplicity and reliability of sensing paper size alluded to above.

It should also be appreciated that printers used in such high precision printing operations are often quite expensive and high throughput levels must be maintained. Further, it is common for some indicia to be changed for each document printed such as check or form numbers so that each document can be uniquely identified. Therefore, the information input rate to the printer must be very high and may be derived from several data processors. For this reason, printers in such applications will often be provided with a dedicated processor for management of the routing of print jobs to various printers that may be grouped together (e.g. with different combinations of toner and printing stock provided by each individual printer) or print engines in a unitary printer. Such a dedicated processor is referred to as an advanced function common control unit (AFCCU).

Since a plurality of printers and/or print engines could be controlled by a single AFCCU, for convenience, the particular toner provided by a connected printer or print engine has been set in hardware such as by the setting of a print engine operating point table in non-volatile memory internal to the AFCCU. The print engine operating point table is specific to each toner that can be used in a particular printer and contains data that alters operating parameters as copies are made to provide compensation of operating points of the printer and thus maintain consistent print quality as well as containing coded information identifying the toner loaded in the printer. This storage arrangement is hardware efficient since the same operating point table can supply compensation data for multiple printers but increases the amount of data which must be sent to a given printer unless stored in the printer, as is often preferred.

Therefore, the AFCCU would prevent forwarding of a print job which specified a particular toner where the memory code indicated that the specified toner was not provided. The print engine operating point table in memory is generally set by a customer engineer (CE) at the time a particular connected printer was dedicated to the use of a particular toner such as MICR.

However, if the CE failed to set the memory, the AFCCU would not be able to discern that such a dedicated printer having a specified toner was connected and a print job specifying a toner to which the printer was dedicated would not be forwarded to it. Conversely, since printers and print engines can accept a variety of toners there is no convenient way for a change of toner to be communicated from a printer to its controlling processor or even the AFCCU. Perhaps more importantly, the AFCCU only recognizes and controls printers at the level of its own ports and any disconnection and erroneous reconnection of printers, even when the toners to which the respective printers or print engines are dedicated are supplied, may result in print jobs being sent to printers and printed using materials other than those specified or being blocked from transmission to printers even when the specified materials are, in fact, available therein.

Additionally, to support high throughput levels while minimizing operating costs of a printer, it is desirable that routine maintenance such as replenishment of toner can be performed by the operator of the printer (e.g. the customer of the manufacturer of the printer) and that the need for service by a CE (generally an employee of the manufacturer of the printer) be minimized, although it may be preferred that dedication of a printer or print engine to specialized toners such as MICR or color toner be performed by a CE.

It is similarly desirable that the operator be able to change types of toners which are not of the special purpose type without need for intervention by a CE so that the full versatility of the printer can be used with minimal added expense and down time. Such provisions are known but are not consistent with special type toners that may require distinct printer control parameters and also lead to errors in printing jobs that may specify particular toners, as alluded to above or even preclude any protection against use of the incorrect toner. Unfortunately, the system architecture including an AFCCU and the need for resetting of associated printer control parameters upon change (or replenishment) of special type toner has not permitted such service to be performed by the customer/operator consistent with the possible use of special type toners.

In summary, practical considerations at the present state of the art has made the set up and maintenance of high performance printers very counter-intuitive, inconvenient and susceptible to costly errors and waste of valuable materials, particularly for the user who must endure downtime and service expense of a CE when toner is to be changed in a printer or when printers must be disconnected from and reconnected to an AFCCU or any other difficulty encountered. Further, the conventional arrangements in regard to printers at the present state of the art do not lead to a high confidence level that print jobs are executed properly and with the proper materials even when the system appears fully functional and operational.

SUMMARY OF THE INVENTION

It is therefore an object of the present invention to provide a feedback link from the printer to the AFCCU and controlling data processor originating a print job to indicate the type of toner or other conditions to which a connected printer is dedicated and provides.

It is another object of the invention to provide a convenient and intuitive arrangement for changing materials supplied to a printer while maintaining correspondence between materials supplied to a printer and the available materials which are indicated to a controlling processor as being available at that printer.

It is a further object of the invention to provide increased reliability and certainty of correct printing with specified materials in a computer controlled printer environment.

It is yet another object of the invention to provide a customer changeable developer (CCD) feature consistent with specified toner confirmation in computer controlled printer systems, particularly in systems including a dedicated processor for communicating print jobs to printers.

In order to accomplish these and other objects of the invention, a printer capable of having any of a plurality of toners installed in a print engine thereof is provided including a developer unit, a switch settable to a state corresponding to a particular the toner, and a communication path connectable to a feedback link extending from the printer to a supporting data processor.

In accordance with another aspect of the invention, a computer controlled printer system is provided including a data processor, a printer capable of having any of a plurality of toners loaded therein, and a dedicated processor connecting and selectively communicating between the data processor and the printer, wherein the printer includes an arrangement for selectively storing and communicating data corresponding to a toner to the dedicated processor and forming a portion of a feedback link extending to the data processor. In accordance with a further aspect of the invention, a method of operating a computer controlled printing system is provided including steps of installing a toner in a connected printer, storing data corresponding to the toner in the printer, and communicating the data to a supporting processor through a dedicated processor for routing data to said printer.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
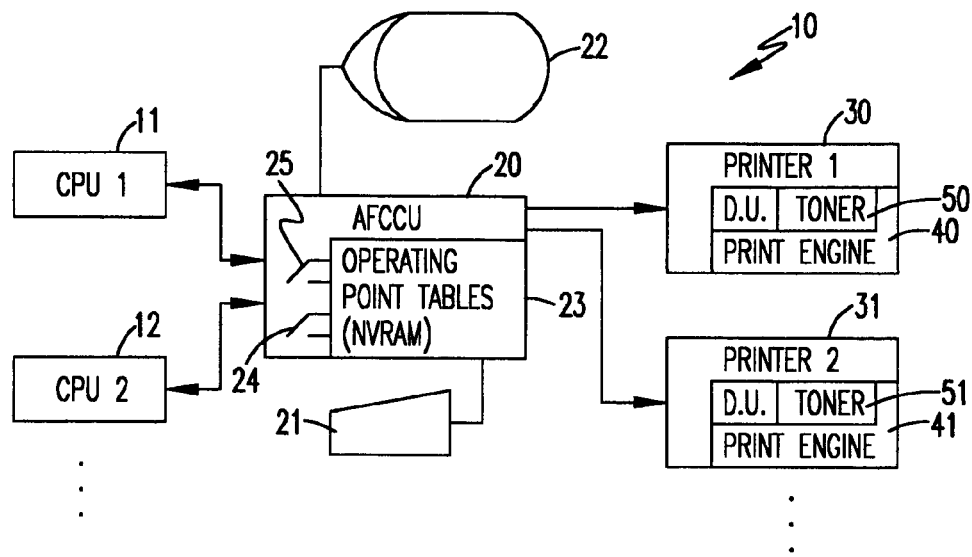
FIG. 1 is a high-level block diagram of a computer controlled printer system as currently employed and over which the present invention provides an improvement.

Referring now to the drawings, and more particularly to FIG. 1, there is shown a high-level block diagram of a computer controlled printer system 10 over which the invention provides an improvement in allowing change of toner/developer and associated maintenance by the customer/operator consistent with either dedication of a printer or print engine(s) to special type toners such as MICR by either a customer engineer (CE) or the user/operator as desired by the manufacturer of the printer. The system as illustrated in FIG. 1 is arranged to facilitate an understanding of the invention as will be discussed in connection with FIG. 2 and no portion of FIG. 1 is admitted to be prior art in regard to the present invention. Accordingly, FIG. 1 has been designated as "Related Art".

A plurality of supporting data processors 11, 12 may be employed to create print jobs which are to be performed such as by supplying data representing text, format and printing parameters such as paper size, toner and the like. It is preferred for high throughput systems to use a dedicated processor such as an AFCCU 20, discussed above, and preferably including keyboard 21 and display interface 22 to control routing of data to particular printers. The particulars of the set-up of each printer, such as the particular toner and printing stock loaded in the printer are stored in hardware (e.g. non-volatile random access memory (NVRAM)) of AFCCU 20 such as a board 23, possibly including switches 24, 25 (but which may simply be a data bit or byte) which may be used to facilitate association of a printer with an operating point table and specify an installed toner, although it is not particularly hardware efficient to do so.

While it is more hardware efficient to simply store such data in memory, CE intervention is needed to do so; effectively requiring dedication of the printer to a particular toner if the toner is of a special type. Even when a CE provides such service, setting such data in the AFCCU requires actions to be performed on different apparatus which are at different locations. Therefore, the procedure is somewhat more prone to errors and results in a reduced customer confidence level regardless of whether the data is stored in switches or memory.

It should be understood that manually operable switches or alternatives thereto such as non-volatile memory (e.g. NVRAM) may be used and details thereof are not important to the overall function of the AFCCU 20. Therefore, the depiction of switches 24, 25 in FIG. 1 should be understood as schematic and generalized as to all such devices capable of producing a signal corresponding to data that may be provided to the AFCCU 20 by, for example, entry from keyboard 21 or manual adjustment of hardware within the AFCCU.

The AFCCU 20 provides outputs to connected printers such as 30, 31 as determined by the particular codes included in the print job data input to AFCCU 20 from processors 11, 12 and the printer parameter data stored at board 23 of AFCCU 20 if not stored in the printer. The AFCCU 20 maintains synchronism between the processors 11, 12 and printers 30, 31 through messages and confirmations sent bi-directionally between the processors 11, 12 and the AFCCU 20. Essentially, the AFCCU 20 does not allow transmission of print job data from any connected processor unless a printer is available, as indicated by data stored in board 23, which corresponds to the print parameters (e.g. particular toner) specified for the print job. In this regard, it should be understood that the particular toner loaded in any particular printer is not communicated from the printer to the AFCCU 20 either when the toner is installed or at the time of the print job, as indicated by unidirectional arrows although some data, such as confirmation of completion of a print job, may, in fact, be communicated from printers 30 or 31 to AFCCU 20.

That is, information concerning materials such as toner 50, 51 loaded in a particular print engine 40, 41 of a particular printer 30, 31 is not communicated from the printer since it should have been persistently stored in board 23 by the CE when the toner is installed in the printer and the printer is dedicated to that toner to the exclusion of other toners. However, if the data is not correctly stored, a print job may not be accepted from a processor even if an appropriately loaded printer is connected. Alternatively, costly errors, alluded to above, will be caused if a developer unit with a different toner is installed after toner information (which matches print parameter data of a print job) is stored in board 23 or a printer is disconnected and reconnected to a different AFCCU port for which different toner data may have been stored. Such costly errors or the effective disablement of one or more printers or print engines (which may also represent substantial expense) are possible because there is no link from the print engine 40 to the AFCCU 20, much less to processors 11, 12.

By the same token, the versatility of a particular printer cannot be readily exploited in a system such as FIG. 1. A change of toner at a particular printer requires information to be entered at board 23 of AFCCU 20 which increases the likelihood that the data will not be correctly entered, particularly if attempted by persons other than the CE. For practical reasons such as avoiding inadvertent change of data, switches 24, 25, if provided, are usually constituted by manually operable mechanical switches that are enclosed behind a removable panel and are thus not accessible to a customer/operator. If switches 24, 25 are not provided, there has been essentially no alternative to a requirement that a CE install print engine operating point data specific to the toner loaded in the printer.

Therefore, the system of FIG. 1 substantially requires that a particular printer be permanently dedicated to use of a particular toner although such action is reversible by trained personnel such as a CE. Therefore, the customer is, as a practical matter, prevented from changing developer units to print with different toners even though a customer changeable developer capability may be highly desirable so that the customer/operator can use the full versatility of the printer in regard to different compatible toners. Conversely, the provision of a CCD feature may preclude the reliable use of optimal printer control parameters for particular special purpose toners, resulting in reduced print quality which the manufacturer may wish to ensure. By the same token, provision of a CCD feature also undermines the manufacturer's ability to control whether or not services of a CE must be obtained under certain circumstances such as where the print engine should, in the manufacturer's view, be thoroughly cleaned when toners are changed.

Figure 2:
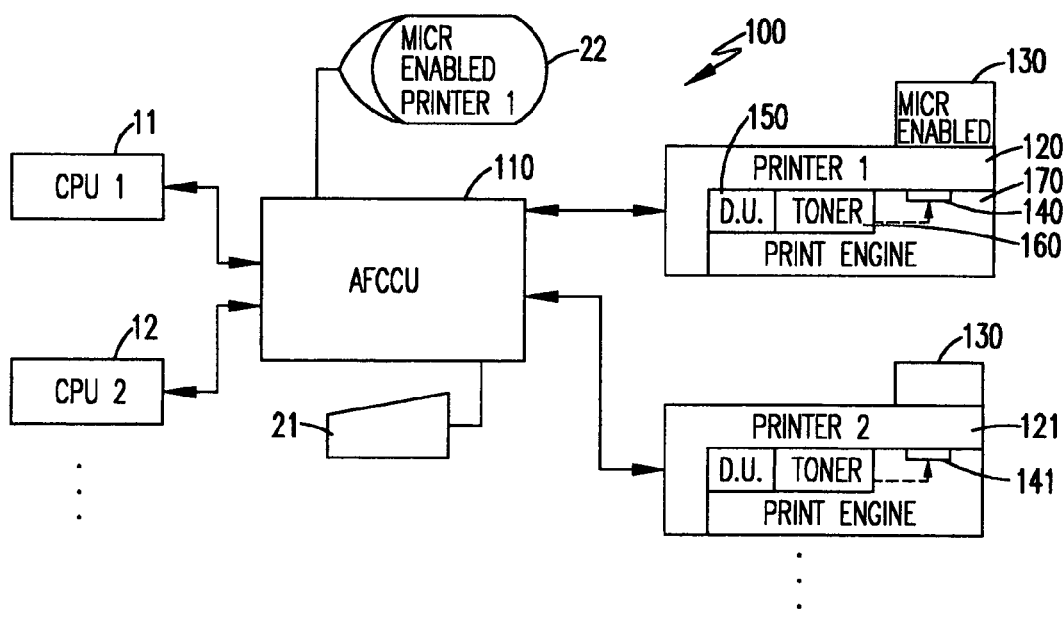
FIG. 2 is a high-level block diagram of a computer controlled printer system in accordance with the invention.

Referring now to FIG. 2, the system in accordance with the invention and having a customer changeable developer feature will now be discussed. Elements of the system of FIG. 1 which are common to and unchanged from elements discussed above in connection with FIG. 1 will be referenced by the same reference numerals and further discussion omitted. Specifically, processors 11, 12 are unaffected by the invention and AFCCU 110 includes keyboard 21 and display 22. The optional switches 24, 25 of AFCCU 20 may be omitted although non-volatile storage board 23 or similar structure may be retained for other purposes, such as retaining a count or pages printed with each of a plurality of toners and some non-volatile storage is preferably provided for printer operating point tables. Printers 120, 121 are very similar to printers 30 and 31 but include toner switches 140, 141, respectively, and preferably include displays 130 for user convenience although not required for the successful practice of the invention.

The nature of the toner switches 140, 141 is not at all critical to the successful practice of the invention but are preferably embodied by mechanical switches capable of representing eight bits of information forming a byte of code. This allows a generic toner and up to seven additional special purpose toners such as color toner or MICR to be represented as a 1-of-n code. (In practice, to date, two hexadecimal rotary switches have been generally employed potentially allowing 256 different toners to be identified, although the majority of codes are unused.)

It is preferred that a generic toner or ink be represented by a code of "00" (hexadecimal) or "00000000" (binary) and that MICR toner be represented by a code of "02" (hexadecimal) or "00000010" (binary) since MICR is possibly the most critical toner likely to be used while a default null field represents a generic or a non-specified toner. This default provides that the feedback system in accordance with the invention is effectively inactive unless a special purpose toner such as MICR or a color toner is installed. It is also preferred to provide an extra bit to switch the CCD function as a security feature whereupon the printer can be dedicated to a specific developer unit with a specific toner even in a generic toner is specified.

Therefore, the system in accordance with the invention will operate transparently and without any change apparent to the user if a generic toner is installed. If a special purpose toner in a developer unit 150 is installed, however, that information can then be provided to the AFCCU 110 through a communication path connectable to a feedback link at any time the AFCCU 110 polls connected printers, such as at the time a processor 11, 12 seeks to transmit a print job to the printer at the time the AFCCU starts the printing of the print job.

Switch 140, 141 may be provided inside the printer at a location which is exposed when the printer cover is opened to remove and replace a developer unit 150. However, it is preferred by the inventors to limit access to the switches by placement behind a panel cover on the printer or, preferably, on the developer unit, which is only removable by the CE since it is considered to be desirable to limit user/customer capability for changing to or from special type toners in order for the manufacturer to assure highest print quality as well as providing protection against inadvertent change of switch setting during normal operation of the printer while allowing a CCD feature if the printer is not dedicated to a particular toner.

It is also possible to provide tabs, conductive areas or the like (generically depicted by dashed lines 160) on developer units to set or reset switches 140, 141 appropriately to the toner in the developer unit. However, such a feature is not presently preferred since it is current practice to re-use developer units and different toners may be supplied when the developer unit is reconditioned for re-use and thus automatic switch setting could be a source of error.

In operation, a toner is loaded into the print engine 170 of a printer 120 in the usual manner regardless of the type of toner contained in the developer unit 150. If the developer unit 150 contains a special purpose toner such as MICR or a color toner, switch 140 is set by the CE (or operator if access is provided) and the status of the printer may be displayed locally on display 130, if desired, to confirm the setting. This information is then transmitted to the AFCCU 110 automatically or in response to a query such as polling of the print engine from the AFCCU. Therefore, feedback from the developer unit 150 is provided to the AFCCU 110 and thence to processors 11, 12 to provide a complete link from developer unit or print engine to the supporting processor while providing information to the AFCCU 110 such that print jobs may be properly routed. The current status of any and/or all print engines 170 can be displayed on the display 22 of the AFCCU 110. Thus, the developer units 150 in various print engines may be readily and freely changed by substantially untrained personnel to exploit the versatility of the printer while preventing costly errors and maintaining operability of each printer. The amount of data communicated between the respective printers and the AFCCU is also potentially reduced since the operating point table data or portions thereof can be downloaded to the printer as needed while maintained in the AFCCU 110 if not stored in the print engines 170.

In view of the foregoing, it is seen that the invention provides an arrangement where toners can be freely changed by the customer without 10 intervention by a CE and in which errors in storing toner identification information are much less likely to occur; increasing confidence levels for customers and avoiding costly printing errors and downtime. The arrangement is convenient and 15 intuitive for untrained or moderately trained personnel and errors are prevented by providing feedback concerning toner identification over a link extending from the printer through the AFCCU to the supporting processor(s) whereas a communication link 20 for such information had previously extended only from the AFCCU.

While the invention has been described in terms of a single preferred embodiment, those skilled in the art will recognize that the invention can be practiced with modification within the spirit and scope of the appended claims.

We claim:

1. A printer system comprising:
   a print job processor for generating a print job request, said request including a toner type requirement data;
   a printer having a structure for receiving a developer unit;
   a developer unit, containing toner having a type from among a plurality of given types, engaged with said structure for receiving a developer unit;
   a switch, in said printer, settable to a state indicating which of said types of said toner is contained in the developer unit, and for generating a toner signal representative of said state;
   a print processor engine associated with said printer, for receiving said toner signal and generating a toner feedback signal in response, and for activating said printer in response to receiving a print activation command;
   a communication path between said print job processor and said print processor engine, said communication path including a central print controller, wherein said central print controller receives said print job request from said print job processor and receives said toner feedback signal from said print processor engine, and wherein
   at least one of said print job processor and said central print controller generates said print activation command based on said print job request and said toner signal, the generation is such that it prevents said printer from printing if said toner signal does not match said toner requirement data.

2. The printer system of claim 1, wherein said switch is attached to said developer unit.

3. The printer system of claim 1, further including means for preventing operators of said printer from access to said switch.

4. The printer system of claim 3 wherein said means for preventing is a removable panel.

5. A computer controlled printer system comprising:
   a data processor for generating a print request specifying a required toner type;
   a printer having structure for containing one or more of a plurality of toners, each of said toners having a type, and having means for storing and communicating a toner signal representing the type of each of said toners contained; and
   a communication path between the data processor and the printer, said path including a common control unit, connecting and selectively communicating between said data processor and said printer, wherein at least one of the common control unit and the data processor controls said printer, based on said print request specifying a required toner type and the toner signal received from the printer, in a manner that prevents said printer from printing if a toner type specified by the print request is not contained in the printer.

6. The computer controlled printer system of claim 5, wherein said structure for containing one or more of a plurality of toners includes a developer unit engaged with said printer, the developer unit containing at least one of said toners, and wherein said means for storing includes a switch attached to said developer unit.

7. The computer controlled printer system of claim 6, further including means for preventing operators of said printer from access to said switch.

8. The computer controlled printer system of claim 7, wherein said means for preventing is a removable panel.

9. A method for printing including:

providing a print job processor;

providing a printer;

providing a communication path between said print job processor and said printer, said communication path including a central control computer for routing data through said communication path;

installing a toner in said printer;

storing in said printer a toner data identifying said toner;

communicating said toner data through said communication path to said print job processor;

communicating a print request from said print job processor to said central control computer, said print request including a toner requirement data;

determining, based on said toner requirement data and said toner data, if the toner installed in said printer is compatible with a print job corresponding to said print request; and preventing, based on said determining, said printer from executing the print job if the compatible toner is not installed in the printer.

10. The method of claim 9, wherein said storing includes setting of a switch.

* * * * *